G. C. POTTS & P. H. WEAVER.
ROD PACKING.
APPLICATION FILED DEC. 14, 1910.
990,587.
Patented Apr. 25, 1911.
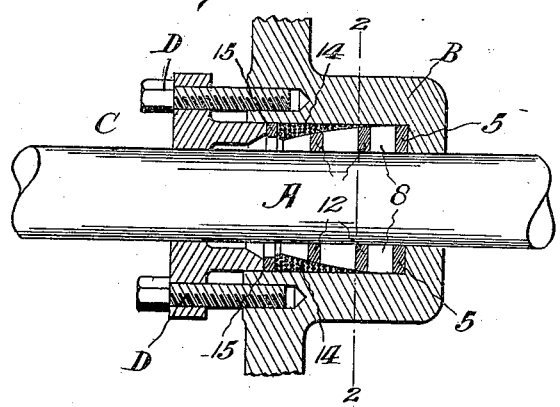
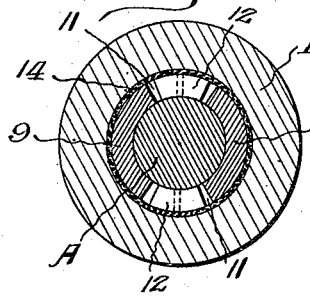
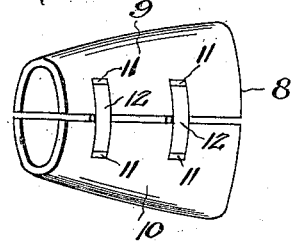
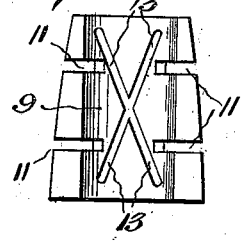
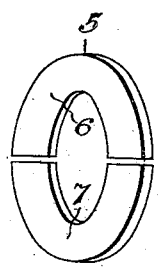
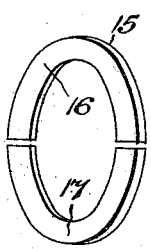
WITNESSES:
INVENTORS:
George C. Potts and
Philo H. Weaver,
ATTORNEYS.

UNITED STATES PATENT OFFICE.

GEORGE C. POTTS AND PHILO H. WEAVER, OF CHICAGO, ILLINOIS.

ROD-PACKING.

990,587.

Specification of Letters Patent. Patented Apr. 25, 1911.

Application filed December 14, 1910. Serial No. 597,257.

*To all whom it may concern:*

Be it known that we, GEORGE C. POTTS and PHILO H. WEAVER, citizens of the United States, residing at Chicago, in the county of Cook and State of Illinois, have invented certain new and useful Improvements in Rod-Packing, of which the following is a specification.

Our present invention relates to packing for piston rods, shafting and the like, our object being to provide a packing which will be inexpensive and which will form a lasting and non-leakable joint.

With the foregoing in mind our invention resides specifically in the features of construction and arrangement shown in the accompanying drawing, in which, Figure 1, is a central vertical section taken through the stuffing box and gland, provided with our improvements. Fig. 2, is a cross-section therethrough taken on line 2—2 of Fig. 1. Fig. 3 is a perspective view of the metallic sleeve complete. Fig. 4, is a similar view of the inner split packing ring. Fig. 5, is a similar view of the outer split pressure ring. Fig. 6, is a plan view of one section of the sleeve.

Our invention, as shown in these figures, comprises an inner split packing ring 5, shown in detail in Fig. 4, the halves 6 and 7 of which are disposed about the shaft or rod A, and within, and against the inner end of the stuffing box B, the inner peripheral edges of said halves 6 and 7 being adapted to closely engage the periphery of the said rod or shaft A, thus preventing to a great extent, the exit of fluid into the stuffing box. Mounted also within the stuffing box B, about the shaft or rod A, is a tapering metal sleeve 8, which is first bored to fit snugly over said rod or shafting and then longitudinally split into half sections 9 and 10, and these sections provided with coincident recesses or pockets 11 in their contiguous edges. The sleeve is placed with its enlarged end abutting the packing ring 5, and its sections 9 and 10 are connected by segmental pieces 12, which span the adjacent longitudinal edges of sections 9 and 10 and have their end portions extending into the recesses or pockets 11. Each of these sections 9 and 10 of the sleeve 8, as shown in Fig. 6, are provided with longitudinally extending and centrally crossed grooves 13, these being for the purpose of holding a lubricant. The space between the wall of the stuffing box, and the sleeve 8, is filled with a soft packing 14, inwardly against which packing is disposed a pressure ring 15 shown in detail in Fig. 5, and split into halves 16 and 17, this latter ring being adapted to receive thereagainst, the inner edge of the gland C which, by means of its connecting members D, thus forms a means to keep the soft packing under adjustable compression to force the sections 9 and 10 of the sleeve 8 into close contact with the surface of the rod or shaft A.

From this it will be seen that packing constructed in accordance with our ideas will be lasting, and readily adaptable to various sizes of shafts or rods, and that the segmental pieces 12, the inner edges of which are forced into close engagement with the surface of the shaft or rod A, will split up and prevent exit of, any fluid which may have escaped past the inner packing ring 5.

The soft pressure packing 14 may be added to from time to time as the sleeve 8 becomes worn and more pressure thereon is necessary, but otherwise the device is capable of lasting as a non-leaking joint, for many times the life of the ordinary packing.

We claim:

1. In a rod packing, the combination with a stuffing box, gland, and the rod passing therethrough, of a sectional packing ring disposed around and in close contact with the rod against the inner end of the stuffing box, a tapering sleeve disposed within the stuffing box with its enlarged end abutting said inner packing ring, and comprising sections closely engaging the surface of the rod, and provided with coincident pockets in their contiguous edges, and segmental pieces spanning the spaces between the said edges of said sections, and having their end portions extending into the said pockets, the inner edges of said segmental pieces being also in close contact with the surface of the rod, and soft packing interposed between the sleeve and the wall of the stuffing box and maintained under an adjustable compression.

2. In a rod packing, the combination with a stuffing box, gland, and the rod passing therethrough, of a sectional packing ring disposed around and in close contact with the rod against the inner end of the stuffing box, a tapering sleeve disposed within the stuffing box with its enlarged end abutting said inner packing ring, and comprising sections closely engaging the surface of the rod, and provided with coincident pockets in their contiguous edges, and segmental pieces spanning the spaces between the said edges of said sections, and having their end portions extending into the said pockets, the inner edges of said segmental pieces being also in close contact with the surface of the rod, and each of said sleeve sections having its inner periphery provided with longitudinally extending and crossed grooves terminating short of the ends thereof, and soft packing interposed between the sleeve and the wall of the stuffing box and maintained under an adjustable compression.

In testimony whereof we affix our signatures in presence of two witnesses.

GEORGE C. POTTS.
PHILO H. WEAVER.

Witnesses:
JOHN F. GUTING,
FRANK KOHL.

Copies of this patent may be obtained for five cents each, by addressing the "Commissioner of Patents, Washington, D. C."